(12) United States Patent
Cleary et al.

(10) Patent No.: US 11,413,848 B2
(45) Date of Patent: Aug. 16, 2022

(54) GLASS ARTICLE

(71) Applicant: Corning Incorporated, Corning, NY (US)

(72) Inventors: Thomas Michael Cleary, Elmira, NY (US); Guangli Hu, Berkeley Heights, NJ (US); John Christopher Mauro, Corning, NY (US); Douglas Miles Noni, Jr., Horseheads, NY (US); Natesan Venkataraman, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 338 days.

(21) Appl. No.: 15/129,278

(22) PCT Filed: Mar. 25, 2015

(86) PCT No.: PCT/US2015/022413
§ 371 (c)(1),
(2) Date: Sep. 26, 2016

(87) PCT Pub. No.: WO2015/148618
PCT Pub. Date: Oct. 1, 2015

(65) Prior Publication Data
US 2017/0174564 A1 Jun. 22, 2017

Related U.S. Application Data

(60) Provisional application No. 61/970,972, filed on Mar. 27, 2014.

(51) Int. Cl.
*C03C 17/02* (2006.01)
*B32B 7/027* (2019.01)
*B32B 17/06* (2006.01)

(52) U.S. Cl.
CPC .............. *B32B 7/027* (2019.01); *B32B 17/06* (2013.01); *B32B 2250/40* (2013.01); *B32B 2307/54* (2013.01)

(58) Field of Classification Search
CPC .......... C03C 17/02; C03C 19/00; C03C 4/00; C03C 3/085; C03C 3/093; C03C 3/091; C03C 3/087; C03B 23/00; C03B 17/02
See application file for complete search history.

(56) References Cited

U.S. PATENT DOCUMENTS 3,673,049 A 6/1972 Giffen et al.
3,737,294 A 6/1973 Dumbaugh
(Continued)

FOREIGN PATENT DOCUMENTS

CN 101076447 A 11/2007
CN 102576106 A 7/2012
(Continued)

OTHER PUBLICATIONS

Patent Cooperation Treaty International Notification of Transmittal of the International Search Report and The Written Opinion of the International Searching Authority, or the Declaration, dated Aug. 20, 2015 , pp. 1-12, International Application No. PCT/US2015/022413, European Patent Office, The Netherlands.
(Continued)

*Primary Examiner* — Cheng Yuan Huang
(74) *Attorney, Agent, or Firm* — Daniel J. Greenhalgh

(57) ABSTRACT

A glass article includes a glass core layer and a glass cladding layer adjacent to the core layer. A coefficient of thermal expansion (CTE) of the core layer is greater than a CTE of the cladding layer. The core layer has a tensile stress, and the cladding layer has a compressive stress. A retained strength of the glass article is a strength determined after abrasion of an outer surface of the glass article with 1 mL of
(Continued)

90 grit SiC particles for 5 seconds at an abrasion pressure, and a ratio of the retained strength at an abrasion pressure of 25 psi to the retained strength at an abrasion pressure of 5 psi is at least about 0.3.

11 Claims, 13 Drawing Sheets

(56) References Cited

U.S. PATENT DOCUMENTS

| | | |
|---|---|---|
| 3,746,526 A | 7/1973 | Giffon |
| 3,849,097 A | 11/1974 | Giffen |
| 3,931,438 A | 1/1976 | Beall |
| 4,102,664 A | 7/1978 | Dumbaugh |
| 4,214,886 A | 7/1980 | Shay |
| 5,342,426 A | 8/1994 | Dumbaugh |
| 5,559,060 A | 9/1996 | Dumbaugh |
| 7,201,965 B2 | 4/2007 | Gulati et al. |
| 7,514,149 B2 | 4/2009 | Bocko |
| 8,007,913 B2 | 8/2011 | Coppola et al. |
| 8,586,492 B2 | 11/2013 | Barefoot et al. |
| 2006/0127679 A1 | 6/2006 | Gulati et al. |
| 2011/0045961 A1 | 2/2011 | Dejneka et al. |
| 2011/0192525 A1 | 8/2011 | Kondo et al. |
| 2011/0200804 A1* | 8/2011 | Tomamoto ............. B32B 17/06 428/213 |
| 2011/0318555 A1 | 12/2011 | Bookbinder et al. |
| 2012/0052271 A1 | 3/2012 | Gomez et al. |
| 2012/0202010 A1 | 8/2012 | Uchida |
| 2013/0004758 A1 | 1/2013 | Dejneka et al. |
| 2013/0236666 A1 | 8/2013 | Bookbinder et al. |
| 2014/0141217 A1* | 5/2014 | Gulati .................... C03B 23/20 428/212 |
| 2014/0242375 A1* | 8/2014 | Mauro .................... C03C 4/005 428/312.6 |
| 2014/0335331 A1* | 11/2014 | Ellison .................. C03B 17/064 428/212 |
| 2015/0099130 A1* | 4/2015 | Mauro .................... C03C 3/089 428/426 |
| 2015/0375475 A1* | 12/2015 | Cook ........................ B32B 7/02 428/149 |

FOREIGN PATENT DOCUMENTS

| | | |
|---|---|---|
| CN | 102971264 A | 3/2013 |
| EP | 2351718 A1 | 8/2011 |
| EP | 2623470 | 8/2013 |
| JP | 2008-522950 A | 7/2008 |
| JP | 2011093728 | 5/2011 |
| JP | 2011136895 | 7/2011 |
| KR | 10-2007-0087650 A | 8/2007 |
| KR | 2012-0132678 A | 12/2012 |
| TW | 201217159 A | 5/2012 |
| TW | 201343590 A | 11/2013 |
| WO | 2013006301 | 1/2013 |
| WO | 2013016157 | 1/2013 |
| WO | 2013065648 | 5/2013 |
| WO | 2013181134 | 5/2013 |
| WO | 2013130700 | 6/2013 |
| WO | 2013130718 | 6/2013 |
| WO | 2013129400 | 9/2013 |
| WO | 2014201320 | 12/2014 |
| WO | 2015023525 | 2/2015 |

OTHER PUBLICATIONS

Suresh, "Graded Materials for Resistance to Contact Deformation and Damage" Science, vol. 292, dated Jun. 29, 2001, pp. 2447-2451.
Korean Patent Application No. 10-2016-7030175,Office Action dated Mar. 22, 2021, 4 page (English Translation Only); Korean Patent Office.

* cited by examiner

GLASS ARTICLE

This application claims the benefit of priority under 35 U.S.C. § 371 of International Application No. PCT/US2015/022413 filed on Mar. 25, 2015, which claims the benefit of priority to U.S. Application No. 61/970,972 filed on Mar. 27, 2014 the content of each of which is incorporated herein by reference in its entirety.

BACKGROUND

1. Field

This disclosure relates to glass articles, and more particularly to laminated glass articles comprising a plurality of glass layers and methods for forming the same.

2. Technical Background

Glass articles can be used in a wide variety of products including, for example, auto-glazing, architectural panels, appliances, and cover glass (e.g., for touch-screen devices such as smartphones, tablets, laptop computers, and monitors). Relatively large flaws can be introduced into the surfaces of glass articles during use. For example, it has been observed that flaws as deep as 200 μm or more have been introduced into the surface of automotive windshields. Thus, it would be desirable for glass articles to have high scratch resistance and to retain their strength even after introduction of relatively large flaws into the surfaces thereof.

SUMMARY

Disclosed herein is a glass article comprising a glass core layer and a glass cladding layer adjacent to the core layer. A coefficient of thermal expansion (CTE) of the core layer is greater than a CTE of the cladding layer. The core layer comprises a tensile stress, and the cladding layer comprises a compressive stress. A retained strength of the glass article comprises a strength determined after abrasion of an outer surface of the glass article with 1 mL of 90 grit SiC particles for 5 seconds at an abrasion pressure, and a ratio of the retained strength at an abrasion pressure of 25 psi to the retained strength at an abrasion pressure of 5 psi is at least about 0.3.

Also disclosed herein is a method comprising forming a glass article comprising a core layer and a cladding layer adjacent to the core layer. A coefficient of thermal expansion (CTE) mismatch between the core layer and the cladding layer and a ratio of a thickness of the core layer to a thickness of the glass article are selected such that a Knoop scratch threshold of the glass article is at least about 5 N, an indentation threshold of the glass article is at least about 20 N, and a compressive stress of the cladding layer is at most about 500 MPa.

Also disclosed herein is a glass article comprising a glass core layer and a glass cladding layer adjacent to the core layer. The core layer comprises from about 50 mol % to about 80 mol % $SiO_2$, from about 5 mol % to about 20 mol % $Al_2O_3$, and from about 1 mol % to about 8 mol % MgO. The cladding layer comprises from about 60 mol % to about 70 mol % $SiO_2$, from about 6 mol % to about 18 mol % $Al_2O_3$, from about 4 mol % to about 21 mol % $B_2O_3$, from about 0.2 mol % to about 5 mol % MgO, and from about 3 mol % to about 12 mol % CaO. A Knoop scratch threshold of the glass article is at least about 5 N, and an indentation threshold of the glass article is at least about 20 N.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
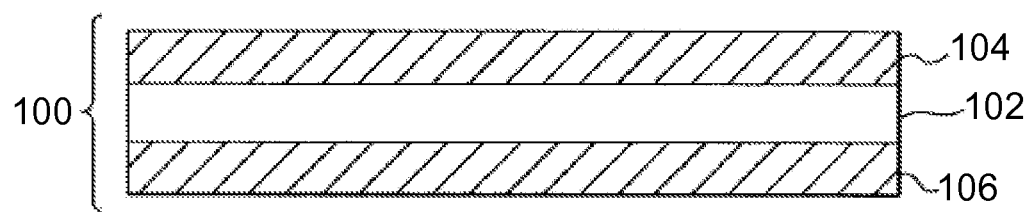
FIG. 1 is a cross-sectional view of one exemplary embodiment of a glass article.

Reference will now be made in detail to exemplary embodiments which are illustrated in the accompanying drawings. Whenever possible, the same reference numerals will be used throughout the drawings to refer to the same or like parts. The components in the drawings are not necessarily to scale, emphasis instead being placed upon illustrating the principles of the exemplary embodiments.

As used herein, the term "average coefficient of thermal expansion" refers to the average coefficient of thermal expansion of a given material or layer between 0° C. and 300° C. As used herein, the term "coefficient of thermal expansion" refers to the average coefficient of thermal expansion unless otherwise indicated.

The strengths of the glass articles described herein are determined using ring-on-ring loading according to the test method described in ASTM C1499-08, Standard Test Method for Monotonic Equibiaxial Flexural Strength of Advanced Ceramics at Ambient Temperature. Generally, the ring-on-ring loading test method is used to determine the biaxial strength of advanced brittle materials at ambient temperature via concentric ring configurations under monotonic uniaxial loading, and has been widely accepted as a method for evaluating the surface strength of glass articles. The ring-on-ring loading results described herein are determined using a 1 in diameter support ring and a 0.5 in diameter loading ring on a 2 in square glass sheet. The contact radius of the ring is 1.6 mm, and the head speed is 1.2 mm/min.

As used herein, the term "retained strength" refers to the strength of a glass article determined after controlled introduction of flaws to an outer surface of the glass article. In some embodiments, the flaws are introduced by abrading the outer surface of the glass article with 1 mL of 90 grit SiC particles for 5 seconds at an abrasion pressure. Such retained strength values generally are reported herein at abrasion pressures of 5 psi, 15 psi, and 25 psi. In other embodiments, the flaws are introduced by scratching the outer surface of the glass article with a Knoop diamond at increasing ramped scratch loads. Such retained strength values generally are reported herein at ramped scratch loads of 0 to 3 N, 0 to 7 N, and 0 to 10 N.

As used herein, the term "Knoop scratch threshold" refers to the load at which lateral cracking is first observed in a glass article in response to scratching the surface of the glass article with a Knoop diamond at increasing load. A mechanical tester holds the Knoop diamond with which the glass article is scratched at increasing loads to determine the onset of lateral cracking. The lateral cracking is evidenced by sustained cracks in the glass article that are greater than twice the width of the original scratch or groove formed by the Knoop diamond. The test is performed at room temperature in 50% relative humidity.

As used herein, the term "indentation threshold" refers to the load at which cracks are first observed in a glass article in response to indentation of the surface of the glass article with a Vickers indenter at increasing load. An indentation load is applied to and then removed from a surface of the glass article with the Vickers indenter at a rate of 0.2 mm/min. The maximum indentation load is held for 10 seconds. The indentation threshold is determined as the indentation load at which 50% of 10 indents exhibit any number of radial/median cracks emanating from the corners of the indent impression. The maximum indentation load is increased until the indentation threshold is met for a given glass article. All indentation measurements are performed at room temperature in 50% relative humidity.

As used herein, the term "Vickers scratch threshold" refers to the load at which lateral cracking is first observed in a glass article in response to scratching the surface of the glass article with a Vickers indenter at increasing load. The test procedure is similar to that used to determine Knoop scratch threshold, except that the Vickers indenter is substituted for the Knoop diamond. The lateral cracking is evidenced by sustained cracks in the glass article that are greater than twice the width of the original scratch or groove formed by the Vickers indenter.

As used herein, the term "drop threshold" refers to a height at which failure of a cover glass is first observed in response to dropping an electronic device comprising the cover glass onto a drop surface from increasing heights. The drop threshold values described herein generally were determined using a case from a commercially available smartphone retrofitted with the cover glass as the electronic device and a LeChase A asphalt drop surface.

In various embodiments, a glass article comprises at least a first layer and a second layer. For example, the first layer comprises a core layer, and the second layer comprises one or more cladding layers adjacent to the core layer. The first layer and/or the second layer are glass layers comprising a glass, a glass-ceramic, or a combination thereof. In some embodiments, the first layer and/or the second layer are transparent glass layers.

FIG. 1 is a cross-sectional view of one exemplary embodiment of a glass article 100. In some embodiments, glass article 100 comprises a laminated sheet comprising a plurality of glass layers. The laminated sheet can be substantially planar as shown in FIG. 1 or non-planar. Glass article 100 comprises a core layer 102 disposed between a first cladding layer 104 and a second cladding layer 106. In some embodiments, first cladding layer 104 and second cladding layer 106 are exterior layers as shown in FIG. 1. In other embodiments, the first cladding layer and/or the second cladding layer are intermediate layers disposed between the core layer and an exterior layer.

Core layer 102 comprises a first major surface and a second major surface opposite the first major surface. In some embodiments, first cladding layer 104 is fused to the first major surface of core layer 102. Additionally, or alternatively, second cladding layer 106 is fused to the second major surface of core layer 102. In such embodiments, the interfaces between first cladding layer 104 and core layer 102 and/or between second cladding layer 106 and core layer 102 are free of any bonding material such as, for example, an adhesive, a coating layer, or any non-glass material added or configured to adhere the respective cladding layers to the core layer. Thus, first cladding layer 104 and/or second cladding layer 106 are fused directly to core layer 102 or are directly adjacent to core layer 102. In some embodiments, the glass article comprises one or more intermediate layers disposed between the core layer and the first cladding layer and/or between the core layer and the second cladding layer. For example, the intermediate layers comprise intermediate glass layers and/or diffusions layers formed at the interface of the core layer and the cladding layer. In some embodiments, glass article 100 comprises a glass-glass laminate in which the interfaces between directly adjacent glass layers are glass-glass interfaces.

In some embodiments, core layer 102 comprises a first glass composition, and first and/or second cladding layers 104 and 106 comprise a second glass composition that is different than the first glass composition. For example, in the embodiment shown in FIG. 1, core layer 102 comprises the first glass composition, and each of first cladding layer 104 and second cladding layer 106 comprises the second glass composition. In other embodiments, the first cladding layer comprises the second glass composition, and the second cladding layer comprises a third glass composition that is different than the first glass composition and/or the second glass composition.

Figure 2:
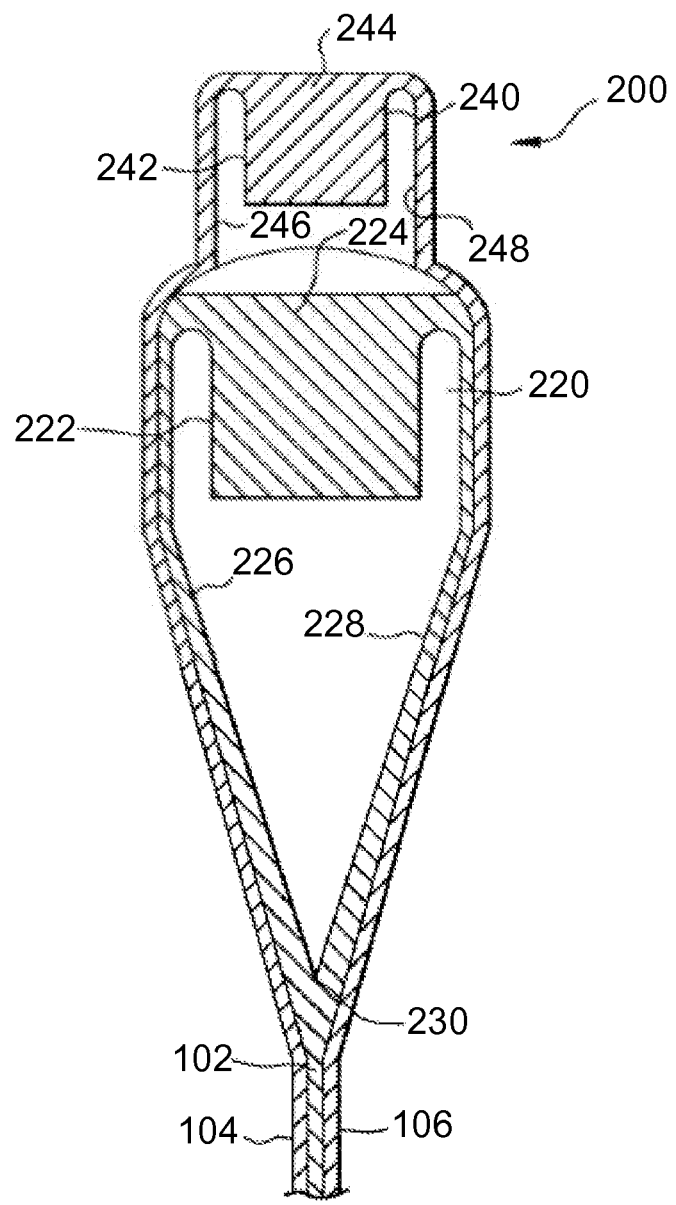
FIG. 2 is a cross-sectional view of one exemplary embodiment of an overflow distributor that can be used to form a glass article.

The glass article can be formed using a suitable process such as, for example, a fusion draw, down draw, slot draw, up draw, or float process. In some embodiments, the glass article is formed using a fusion draw process. FIG. 2 is a cross-sectional view of one exemplary embodiment of an overflow distributor 200 that can be used to form a glass article such as, for example, glass article 100. Overflow distributor 200 can be configured as described in U.S. Pat. No. 4,214,886, which is incorporated herein by reference in its entirety. For example, overflow distributor 200 comprises a lower overflow distributor 220 and an upper overflow distributor 240 positioned above the lower overflow distributor. Lower overflow distributor 220 comprises a trough 222. A first glass composition 224 is melted and fed into trough 222 in a viscous state. First glass composition 224 forms core layer 102 of glass article 100 as further described below. Upper overflow distributor 240 comprises a trough 242. A second glass composition 244 is melted and fed into trough 242 in a viscous state. Second glass composition 244 forms first and second cladding layers 104 and 106 of glass article 100 as further described below.

First glass composition 224 overflows trough 222 and flows down opposing outer forming surfaces 226 and 228 of lower overflow distributor 220. Outer forming surfaces 226 and 228 converge at a draw line 230. The separate streams of first glass composition 224 flowing down respective outer forming surfaces 226 and 228 of lower overflow distributor 220 converge at draw line 230 where they are fused together to form core layer 102 of glass article 100.

Second glass composition 244 overflows trough 242 and flows down opposing outer forming surfaces 246 and 248 of upper overflow distributor 240. Second glass composition 244 is deflected outward by upper overflow distributor 240 such that the second glass composition flows around lower overflow distributor 220 and contacts first glass composition 224 flowing over outer forming surfaces 226 and 228 of the lower overflow distributor. The separate streams of second glass composition 244 are fused to the respective separate streams of first glass composition 224 flowing down respective outer forming surfaces 226 and 228 of lower overflow distributor 220. Upon convergence of the streams of first glass composition 224 at draw line 230, second glass composition 244 forms first and second cladding layers 104 and 106 of glass article 100.

In some embodiments, first glass composition 224 of core layer 102 in the viscous state is contacted with second glass composition 244 of first and second cladding layers 104 and 106 in the viscous state to form the laminated sheet. In some of such embodiments, the laminated sheet is part of a glass ribbon traveling away from draw line 230 of lower overflow distributor 220 as shown in FIG. 2. The glass ribbon can be drawn away from lower overflow distributor 220 by a suitable means including, for example, gravity and/or pulling rollers. The glass ribbon cools as it travels away from lower overflow distributor 220. The glass ribbon is severed to separate the laminated sheet therefrom. Thus, the laminated sheet is cut from the glass ribbon. The glass ribbon can be severed using a suitable technique such as, for example, scoring, bending, thermally shocking, and/or laser cutting. In some embodiments, glass article 100 comprises the laminated sheet as shown in FIG. 1. In other embodiments, the laminated sheet can be processed further (e.g., by cutting or molding) to form glass article 100.

Although glass article 100 shown in FIG. 1 comprises three layers, other embodiments are included in this disclosure. In other embodiments, a glass article can have a determined number of layers, such as two, four, or more layers. For example, a glass article comprising two layers can be formed using two overflow distributors positioned so that the two layers are joined while traveling away from the respective draw lines of the overflow distributors or using a single overflow distributor with a divided trough so that two glass compositions flow over opposing outer forming surfaces of the overflow distributor and converge at the draw line of the overflow distributor. A glass article comprising four or more layers can be formed using additional overflow distributors and/or using overflow distributors with divided troughs. Thus, a glass article having a determined number of layers can be formed by modifying the overflow distributor accordingly.

In some embodiments, glass article 100 comprises a thickness of at least about 0.05 mm, at least about 0.1 mm, at least about 0.2 mm, or at least about 0.3 mm. Additionally, or alternatively, glass article 100 comprises a thickness of at most about 2 mm, at most about 1.5 mm, at most about 1 mm, at most about 0.7 mm, or at most about 0.5 mm. In some embodiments, a ratio of a thickness of core layer 102 to a thickness of glass article 100 is at least about 0.8, at least about 0.85, at least about 0.9, or at least about 0.95. In some embodiments, a thickness of the second layer (e.g., each of first cladding layer 104 and second cladding layer 106) is from about 0.01 mm to about 0.3 mm.

In some embodiments, the first glass composition and/or the second glass composition comprise a liquidus viscosity suitable for forming glass article 100 using a fusion draw process as described herein. For example, the first glass composition of the first layer (e.g., core layer 102) comprises a liquidus viscosity of at least about 100 kP, at least about 200 kP, or at least about 300 kP. Additionally, or alternatively, the first glass composition comprises a liquidus viscosity of at most about 3000 kP, at most about 2500 kP, at most about 1000 kP, or at most about 800 kP. Additionally, or alternatively, the second glass composition of the second layer (e.g., first and/or second cladding layers 104 and 106) comprises a liquidus viscosity of at least about 50 kP, at least about 100 kP, or at least about 200 kP. Additionally, or alternatively, the second glass composition comprises a liquidus viscosity of at most about 3000 kP, at most about 2500 kP, at most about 1000 kP, or at most about 800 kP. The first glass composition can aid in carrying the second glass composition over the overflow distributor to form the second layer. Thus, the second glass composition can comprise a liquidus viscosity that is lower than generally considered suitable for forming a single layer sheet using a fusion draw process.

In some embodiments, glass article 100 is configured as a strengthened glass article. For example, in some embodiments, the second glass composition of the second layer (e.g., first and/or second cladding layers 104 and 106) comprises a different average coefficient of thermal expansion (CTE) than the first glass composition of the first layer (e.g., core layer 102). For example, first and second cladding layers 104 and 106 are formed from a glass composition having a lower average CTE than core layer 102. The CTE mismatch (i.e., the difference between the average CTE of first and second cladding layers 104 and 106 and the average CTE of core layer 102) results in formation of compressive stress in the cladding layers and tensile stress in the core layer upon cooling of glass article 100. In various embodiments, each of the first and second cladding layers, independently, can have a higher average CTE, a lower average CTE, or substantially the same average CTE as the core layer.

In some embodiments, the average CTE of the first layer (e.g., core layer 102) and the average CTE of the second layer (e.g., first and/or second cladding layers 104 and 106) differ by at least about $5 \times 10^{-7}$ °C.$^{-1}$, at least about $15 \times 10^{-7}$ °C.$^{-1}$, or at least about $25 \times 10^{-7}$ °C.$^{-1}$. Additionally, or alternatively, the average CTE of the first layer and the average CTE of the second layer differ by at most about $55 \times 10^{-7}$ °C.$^{-1}$, at most about $50 \times 10^{-7}$ °C.$^{-1}$, at most about $40 \times 10^{-7}$ °C.$^{-1}$, at most about $30 \times 10^{-7}$ °C.$^{-1}$, at most about $20 \times 10^{-7}$ °C.$^{-1}$, or at most about $10 \times 10^{-7}$ °C.$^{-1}$. For example, in some embodiments, the average CTE of the first layer and the average CTE of the second layer differ by from about $5 \times 10^{-7}$ °C.$^{-1}$ to about $30 \times 10^{-7}$ °C.$^{-1}$ or from about $5 \times 10^{-7}$ °C.$^{-1}$ to about $20 \times 10^{-7}$ °C.$^{-1}$. In some embodiments, the second glass composition of the second layer comprises an average CTE of at most about $40 \times 10^{-7}$ °C.$^{-1}$, or at most about $35 \times 10^{-7}$ °C.$^{-1}$. Additionally, or alternatively, the second glass composition of the second layer comprises an average CTE of at least about $25 \times 10^{-7}$ °C.$^{-1}$, or at least about $30 \times 10^{-7}$ °C.$^{-1}$. Additionally, or alternatively, the first glass composition of the first layer comprises an average CTE of at least about $40 \times 10^{-7}$ °C.$^{-1}$, at least about $50 \times 10^{-7}$ °C.$^{-1}$, or at least about $55 \times 10^{-7}$ °C.$^{-1}$. Additionally, or alternatively, the first glass composition of the first layer comprises an average CTE of at most about $90 \times 10^{-7}$ °C.$^{-1}$, at most about $85 \times 10^{-7}$ °C.$^{-1}$, at most about $80 \times 10^{-7}$ °C.$^{-1}$, at most about $70 \times 10^{-7}$ °C.$^{-1}$, or at most about $60 \times 10^{-7}$ °C.$^{-1}$.

In various embodiments, the glass compositions and the relative thicknesses of the glass layers can be selected to achieve a glass article having desired strength properties. For example, in some embodiments, the first glass composition of the first layer (e.g., core layer 102) and the second glass composition of the second layer (e.g., first and/or second cladding layers 104 and 106) are selected to achieve a desired CTE mismatch, and the thicknesses of each of the first layer and the second layer are selected, in combination with the desired CTE mismatch, to achieve a desired compressive stress in the second layer, a desired tensile stress in the first layer, a desired retained strength, and/or a desired drop threshold.

In various embodiments, the glass compositions and the relative thicknesses of the glass layers can be selected to achieve a glass article having desired surface properties. For example, in some embodiments, the first glass composition of the first layer (e.g., core layer 102), the second glass composition of the second layer (e.g., first and/or second cladding layers 104 and 106), and the thicknesses of each of the first layer and the second layer are selected to achieve a glass article having a desired Knoop scratch threshold and/or a desired indentation threshold.

In some embodiments, the Knoop scratch threshold of the glass article is at least about 5 N, at least about 10 N, or at least about 15 N. Additionally, or alternatively, the indentation threshold of the glass article is at least about 20 N, at least about 30 N, or at least about 40 N. Additionally, or alternatively, the Vickers scratch threshold of the glass article is at least about 2 N, at least about 3 N, at least about 5 N, or at least about 7 N. Additionally, or alternatively, the drop threshold of the glass article is at least about 100 cm, at least about 140 cm, or at least about 160 cm.

The strength and surface properties of the glass article can be related to one another. Thus, the various properties of the glass article (e.g., CTE mismatch, compressive stress, tensile stress, retained strength, drop threshold, Knoop scratch threshold, and/or indentation threshold) generally cannot be adjusted independently of one another, but rather, are adjusted in combination or balanced with one another to produce the glass article. Conventional wisdom suggests that a glass article with relatively higher compressive stress will have higher Knoop scratch, indentation, and drop threshold values than a glass article with relatively lower compressive stress. However, proper selection of the various properties as described herein can enable formation of a glass article having improved Knoop scratch, indentation, and/or drop thresholds with relatively lower compressive stress. The improved properties can be imparted to the glass article as-formed without additional processing (e.g., ion-exchange treatment). For example, the as-formed fusion formed glass laminate can have improved Knoop scratch, indentation, and/or drop thresholds compared to ion-exchanged glass articles with higher compressive stresses than the fusion formed glass laminate.

In some embodiments, the compressive stress of the cladding layers is at most about 800 MPa, at most about 500 MPa, at most about 300 MPa, at most about 200 MPa, at most about 150 MPa, at most about 100 MPa, at most about 50 MPa, or at most about 40 MPa. Additionally, or alternatively, the compressive stress of the cladding layers is at least about 10 MPa, at least about 20 MPa, at least about 30 MPa, at least about 50 MPa, or at least about 100 MPa.

The glass articles described herein can be useful in a variety of applications including, for example, auto-glazing, architectural, appliance, and consumer electronics (e.g., cover glass) applications. Glass articles with relatively lower strength can be beneficial for use, for example, in automotive applications (e.g., automotive windshields). Glass articles with relatively higher strength can be beneficial for use, for example, in cover glass applications (e.g., touch-screen devices). In some embodiments, the glass compositions and the relative thicknesses of the glass layers are selected as described herein to form a glass article having a predetermined strength (e.g., unabraded strength and/or retained strength). Thus, the strength of the glass article is controlled by manipulating the glass compositions and relative thicknesses of the glass layers to form a glass article that is suitable for a desired application.

In various applications, it can be beneficial for the strength of the glass article to remain substantially constant in response to varying degrees of surface abrasion or surface insults. In other words, it can be beneficial for the strength of the glass article to be relatively insensitive to surface abrasion or surface insults. Thus, the strength of the glass article can remain substantially constant over the life of the glass article, even after varying amounts of damage are caused to the surface of the glass article during use thereof. The strength of the glass article can remain at or near the predetermined strength during the life of the glass article.

In some embodiments, a ratio of the retained strength of the glass article at an abrasion pressure of 25 psi to the retained strength of the glass article at an abrasion pressure of 5 psi is at least about 0.3, at least about 0.4, at least about 0.5, at least about 0.6, at least about 0.7, at least about 0.8, or at least about 0.9. Additionally, or alternatively, a ratio of the retained strength of the glass article at a ramped Knoop scratch load of 0 to 10 N to the retained strength of the glass article at a ramped Knoop scratch load of 0 to 3 N is at least about 0.3, at least about 0.4, at least about 0.5, at least about 0.6, at least about 0.7, at least about 0.8, or at least about 0.9. Additionally, or alternatively, each of the retained strength at an abrasion pressure of 5 psi and the retained strength at an abrasion pressure of 25 psi is at least about 80 MPa, at least about 90 MPa, or at least about 100 MPa. Additionally, or alternatively, each of the retained strength at an abrasion pressure of 5 psi and the retained strength at an abrasion pressure of 25 psi is at most about 375 MPa, at most about 350 MPa, or at most about 300 MPa.

In some embodiments, the glass article comprises an elastic property gradient. Thus, one or more elastic properties of the glass article vary along the thickness of the glass article. For example, one or more of the Young's modulus, the shear modulus, or the Poisson's ratio of the glass article varies in the thickness direction of the glass article. The elastic property gradient can be formed, for example, as a result of different glass layers having different elastic properties and/or interdiffusion between adjacent glass layers. In some embodiments, the elastic property gradient comprises a step change in the elastic property at the interface between the first layer and the second layer of the glass article (e.g., the clad/core interface). For example, at least one elastic property of the first layer is different than the corresponding elastic property of the second layer. In other embodiments, the elastic property gradient comprises a gradual variation in which at least one elastic property changes from a first value at a first position along the thickness direction of the glass article to a second value at a second position along the thickness direction of the glass article. For example, the at least one elastic property of the second layer decreases in a direction away from the core layer toward a surface of the glass article. The elastic property gradient can enhance the damage resistance of the glass article. For example, the gradient region can be on the order of an indent size (e.g., tens of microns) to enhance the damage resistance of the glass article.

The first glass composition of the first layer (e.g., core layer 102) and the second glass composition of the second layer (e.g., first cladding layer 104 and/or second cladding layer 106) can comprise suitable glass compositions capable of forming a glass article with desired properties as described herein. Exemplary first (core) glass compositions and exemplary second (clad) glass compositions are shown in Tables 1 and 2, respectively. The amounts of the various components are given in Tables 1 and 2 as mol % on an oxide basis.

In some embodiments, the first glass composition comprises a glass network former selected from the group consisting of $SiO_2$, $Al_2O_3$, $B_2O_3$, and combinations thereof. For example, the first glass composition comprises at least about 50 mol % $SiO_2$, at least about 55 mol % $SiO_2$, at least about 60 mol % $SiO_2$, or at least about 65 mol % $SiO_2$. Additionally, or alternatively, the first glass composition comprises at most about 80 mol % $SiO_2$, at most about 70 mol % $SiO_2$, at most about 68 mol % $SiO_2$, or at most about 60 mol % $SiO_2$. Additionally, or alternatively, the first glass composition comprises at least about 5 mol % $Al_2O_3$, at least about 9 mol % $Al_2O_3$, or at least about 12 mol % $Al_2O_3$. Additionally, or alternatively, the first glass composition comprises at most about 20 mol % $Al_2O_3$, at most about 17 mol % $Al_2O_3$, or at most about 11 mol % $Al_2O_3$. Additionally, or alternatively, the first glass composition comprises at least about 3 mol % $B_2O_3$, at least about 6 mol % $B_2O_3$, or at least about 7 mol % $B_2O_3$. Additionally, or alternatively, the first glass composition comprises at most about 11 mol % $B_2O_3$, at most about 8 mol % $B_2O_3$, or at most about 4 mol % $B_2O_3$. In some embodiments, the first glass composition is substantially free of $B_2O_3$. For example, the first glass composition comprises at most about 0.1 mol % $B_2O_3$.

In some embodiments, the first glass composition comprises an alkali metal oxide selected from the group consisting of $Li_2O$, $Na_2O$, $K_2O$, and combinations thereof. For example, the first glass composition comprises at least about 0.05 mol % $Na_2O$, at least about 10 mol % $Na_2O$, or at least about 13 mol % $Na_2O$. Additionally, or alternatively, the first glass composition comprises at most about 16 mol % $Na_2O$, at most about 14 mol % $Na_2O$, at most about 2 mol % $Na_2O$, or at most about 0.1 mol % $Na_2O$. Additionally, or alternatively, the first glass composition comprises at least about 0.01 mol % $K_2O$, at least about 2 mol % $K_2O$, or at least about 8 mol % $K_2O$. Additionally, or alternatively, the first glass composition comprises at most about 15 mol % $K_2O$, at most about 9 mol % $K_2O$, at most about 6 mol % $K_2O$, or at most about 0.1 mol % $K_2O$.

In some embodiments, the first glass composition comprises an alkaline earth oxide selected from the group consisting of MgO, CaO, SrO, BaO, and combinations thereof. For example, the first glass composition comprises at least about 1 mol % MgO, at least about 2 mol % MgO, at least about 3 mol % MgO, or at least about 4 mol % MgO. Additionally, or alternatively, the first glass composition comprises at most about 8 mol % MgO, at most about 4 mol % MgO, or at most about 3 mol % MgO. Additionally, or alternatively, the first glass composition comprises at least about 0.01 mol % CaO, at least about 2 mol % CaO, at least about 4 mol % CaO, at least about 5 mol % CaO, or at least about 6 mol % CaO. Additionally, or alternatively, the first glass composition comprises at most about 8 mol % CaO, at most about 7 mol % CaO, at most about 0.1 mol % CaO, or at most about 0.01 mol % CaO. Additionally, or alternatively, the first glass composition comprises at least about 3 mol % SrO, at least about 4 mol % SrO, at least about 5 mol % SrO, or at least about 6 mol % SrO. Additionally, or alternatively, the first glass composition comprises at most about 7 mol % SrO, at most about 6 mol % SrO, or at most about 5 mol % SrO. Additionally, or alternatively, the first glass composition comprises at least about 0.01 mol % BaO, at least about 0.02 mol % BaO, or at least about 0.07 mol % BaO. Additionally, or alternatively, the first glass composition comprises at most about 0.1 mol % BaO, at most about 0.09 mol % BaO, at most about 0.05 mol % BaO, or at most about 0.01 mol % BaO. In some embodiments, the first glass composition is substantially free of SrO. For example, the first glass composition comprises at most about 0.1 mol % SrO.

In some embodiments, the first glass composition comprises one or more additional components including, for example $SnO_2$, $Sb_2O_3$, $As_2O_3$, $Ce_2O_3$, Cl (e.g., derived from KCl or NaCl), $ZrO_2$, or $Fe_2O_3$.

In some embodiments, the second glass composition comprises a glass network former selected from the group consisting of $SiO_2$, $Al_2O_3$, $B_2O_3$, and combinations thereof. For example, the second glass composition comprises at least about 60 mol % $SiO_2$, at least about 62 mol % $SiO_2$, or at least about 67 mol % $SiO_2$. Additionally, or alternatively, the second glass composition comprises at most about 70 mol % $SiO_2$, at most about 68 mol % $SiO_2$, at most about 65 mol % $SiO_2$, or at most about 63 mol % $SiO_2$. Additionally, or alternatively, the second glass composition comprises at least about 6 mol % $Al_2O_3$, at least about 10 mol % $Al_2O_3$, or at least about 12 mol % $Al_2O_3$. Additionally, or alternatively, the second glass composition comprises at most about 18 mol % $Al_2O_3$, at most about 13 mol % $Al_2O_3$, or at most about 8 mol % $Al_2O_3$. Additionally, or alternatively, the second glass composition comprises at least about 4 mol % $B_2O_3$, at least about 6 mol % $B_2O_3$, at least about 9 mol % $B_2O_3$, or at least about 16 mol % $B_2O_3$. Additionally, or alternatively, the second glass composition comprises at most about 21 mol % $B_2O_3$, at most about 18 mol % $B_2O_3$, or at most about 11 mol % $B_2O_3$.

In some embodiments, the second glass composition comprises an alkali metal oxide selected from the group consisting of $Li_2O$, $Na_2O$, $K_2O$, and combinations thereof. For example, the second glass composition comprises from about 0 mol % to about 0.1 mol % $Na_2O$, or from about 0 mol % to about 0.06 mol % $Na_2O$. Additionally, or alternatively, the second glass composition comprises from about 0 mol % to about 0.05 mol % $K_2O$, or from about 0 mol % to about 0.03 mol % $K_2O$. In some embodiments, the second glass composition is substantially free of alkali metal. For example, the second glass composition comprises at most about 0.1 mol % alkali metal oxide. In other embodiments, the second glass composition comprises from about 5 mol % to about 10 mol % alkali metal oxide.

In some embodiments, the second glass composition comprises an alkaline earth oxide selected from the group consisting of MgO, CaO, SrO, BaO, and combinations thereof. For example, the second glass composition comprises at least about 0.2 mol % MgO, at least about 1 mol % MgO, or at least about 3 mol % MgO. Additionally, or alternatively, the second glass composition comprises at most about 5 mol % MgO, at most about 4 mol % MgO, at most about 2 mol % MgO, or at most about 0.5 mol % MgO. Additionally, or alternatively, the second glass composition comprises at least about 3 mol % CaO, at least about 4 mol % CaO, at least about 5 mol % CaO, or at least about 8 mol % CaO. Additionally, or alternatively, the second glass composition comprises at most about 12 mol % CaO, at most about 9 mol % CaO, at most about 8 mol % CaO, or at most about 5 mol % CaO. Additionally, or alternatively, the second glass composition comprises at least about 0.2 mol % SrO, at least about 1 mol % SrO, or at least about 2 mol % SrO. Additionally, or alternatively, the second glass composition comprises at most about 3 mol % SrO, at most about 2 mol % SrO, or at most about 1 mol % SrO. Additionally, or alternatively, the second glass composition comprises at least about 0.01 mol % BaO, at least about 0.02 mol % BaO, or at least about 1 mol % BaO. Additionally, or alternatively, the second glass composition comprises at most about 2 mol % BaO, at most about 0.5 mol % BaO, at most about 0.03 mol % BaO, at most about 0.02 mol % BaO, or at most about 0.01 mol % BaO. In some embodiments, the second glass composition comprises from about 3 mol % to about 16 mol % alkaline earth oxide.

In some embodiments, the second glass composition comprises one or more additional components including, for example $SnO_2$, $Sb_2O_3$, $As_2O_3$, $Ce_2O_3$, Cl (e.g., derived from KCl or NaCl), $ZrO_2$, or $Fe_2O_3$.

TABLE 1

Exemplary First (Core) Glass Compositions

| | 1-1 | 1-2 | 1-3 | 1-4 | 1-5 | 1-6 |
|---|---|---|---|---|---|---|
| $SiO_2$ | 61.97 | 66.54 | 63.46 | 69.05 | 56.12 | 59.05 |
| $Al_2O_3$ | 10.89 | 10.03 | 9.56 | 10.2 | 16.73 | 15.1 |
| $B_2O_3$ | 10.09 | 6 | 7.09 | | 10.5 | 6.26 |
| $Na_2O$ | 0.07 | 0.09 | 0.09 | 15.13 | 0.064 | 0.086 |
| $K_2O$ | 2.17 | 5.79 | 5.79 | | 3.084 | 8.059 |
| MgO | 6.16 | 1.9 | 2.49 | 5.49 | 3.74 | 1.13 |
| CaO | 5.45 | 6.23 | 7.41 | | 4.61 | 5.16 |
| SrO | 3.09 | 3.28 | 3.95 | | 4.83 | 5.02 |
| BaO | 0.03 | 0.04 | 0.04 | | 0.08 | 0.08 |
| $SnO_2$ | 0.04 | 0.07 | 0.07 | 0.13 | 0.092 | 0.151 |
| $ZrO_2$ | 0.01 | 0.02 | 0.03 | | 0.023 | 0.032 |
| $Fe_2O_3$ | 0.01 | 0.01 | 0.01 | | 0.033 | 0.031 |
| $As_2O_3$ | | | | | 0.0002 | 0.0002 |

| | 1-7 | 1-8 | 1-9 | 1-10 | 1-11 |
|---|---|---|---|---|---|
| $SiO_2$ | 56.24 | 67.45 | 69.17 | 68.84 | 69.86 |
| $Al_2O_3$ | 14.38 | 12.69 | 8.53 | 10.63 | 10.99 |
| $B_2O_3$ | 7.16 | 3.67 | | | |
| $Na_2O$ | 0.084 | 13.67 | 13.94 | 14.86 | 11.74 |
| $K_2O$ | 8.042 | 0.02 | 1.17 | 0.02 | 4.07 |
| MgO | 1.48 | 2.36 | 6.45 | 5.43 | 2.87 |
| CaO | 6.13 | 0.03 | 0.54 | 0.04 | |
| SrO | 6.04 | | | | |
| BaO | 0.1 | | | | 0.1 |
| $SnO_2$ | 0.164 | 0.09 | 0.19 | 0.17 | 0.45 |
| $ZrO_2$ | 0.051 | 0.01 | | | |
| $Fe_2O_3$ | 0.032 | 0.01 | | | |
| $As_2O_3$ | 0.0002 | | | | |

TABLE 2

Exemplary Second (Clad) Glass Compositions

| | 2-1 | 2-2 | 2-3 | 2-4 | 2-5 | 2-6 | 2-7 | 2-8 |
|---|---|---|---|---|---|---|---|---|
| $SiO_2$ | 69.44 | 67.55 | 62.93 | 64.59 | 60.48 | 62.39 | 67.29 | 60.19 |
| $Al_2O_3$ | 12.36 | 11 | 10.74 | 7.38 | 11.55 | 17.21 | 6.47 | 11.66 |
| $B_2O_3$ | 4.35 | 9.83 | 13.16 | 16.45 | 17.6 | 10.5 | 20.99 | 17.75 |
| $Na_2O$ | | | | | 0.05 | | | |
| $K_2O$ | | | | | 0.022 | | | |
| MgO | 4.01 | 2.26 | 3.58 | 2.21 | 1.38 | 1.41 | 0.35 | 1.38 |
| CaO | 5.98 | 8.73 | 7.32 | 8.14 | 7.01 | 7.51 | 4.49 | 7.07 |
| SrO | 1.73 | 0.52 | 2.17 | 1.11 | 1.86 | 0.83 | 0.29 | 1.79 |
| BaO | 1.98 | | 0.01 | 0.01 | 0.02 | | 0.01 | |
| $SnO_2$ | 0.1 | 0.07 | 0.07 | 0.06 | 0.208 | 0.16 | 0.05 | 0.16 |
| $ZrO_2$ | 0.03 | 0.02 | | | 0.14 | | 0.05 | |

TABLE 2-continued

| Exemplary Second (Clad) Glass Compositions | | | | | | |
|---|---|---|---|---|---|---|
| $Fe_2O_3$ | 0.02 | 0.01 | 0.01 | 0.01 | 0.039 | 0.01 |
| $As_2O_3$ | | | | | 0.0004 | |

The glass articles described herein can be used for a variety of applications including, for example, for cover glass or glass backplane applications in consumer or commercial electronic devices including, for example, LCD and LED displays, computer monitors, and automated teller machines (ATMs); for touch screen or touch sensor applications, for portable electronic devices including, for example, mobile telephones, personal media players, and tablet computers; for integrated circuit applications including, for example, semiconductor wafers; for photovoltaic applications; for architectural glass applications; for automotive or vehicular glass applications; or for commercial or household appliance applications.

EXAMPLES

Various embodiments will be further clarified by the following examples.

Example 1

A laminated glass sheet having the general structure shown in FIG. 1 was formed using a fusion draw process. The core layer was formed from exemplary glass composition 1-5, which had an average CTE of $43.9 \times 10^{-7}$ °C.$^{-1}$. The first and second cladding layers were formed from exemplary glass composition 2-5, which had an average CTE of $35.6 \times 10^{-7}$ °C.$^{-1}$. The thickness of the glass sheet was 1.5 mm. The thickness of the core layer was about 1.125 mm, and the thickness of each cladding layer was about 0.1875 mm. The glass sheet had a surface compression of 35 MPa.

Example 2

A laminated glass sheet having the general structure shown in FIG. 1 was formed using a fusion draw process. The core layer was formed from exemplary glass composition 1-5, which had an average CTE of $43.9 \times 10^{-7}$ °C.$^{-1}$. The first and second cladding layers were formed from exemplary glass composition 2-5, which had an average CTE of $35.6 \times 10^{-7}$ °C.$^{-1}$. The thickness of the glass sheet was 0.5 mm. The thickness of the core layer was about 0.375 mm, and the thickness of each cladding layer was about 0.0625 mm. The glass sheet had a surface compression of 35 MPa.

Example 3

A laminated glass sheet having the general structure shown in FIG. 1 was formed using a fusion draw process. The core layer was formed from exemplary glass composition 1-7, which had an average CTE of $54.9 \times 10^{-7}$ °C.$^{-1}$. The first and second cladding layers were formed from exemplary glass composition 2-5, which had an average CTE of $35.6 \times 10^{-7}$ °C.$^{-1}$. The thickness of the glass sheet was 1 mm. The thickness of the core layer was about 0.9 mm, and the thickness of each cladding layer was about 0.05 mm. The glass sheet had a surface compression of 150 MPa.

Example 4

A laminated glass sheet having the general structure shown in FIG. 1 was formed using a fusion draw process. The core layer was formed from exemplary glass composition 1-6, which had an average CTE of $59.8 \times 10^{-7}$ °C.$^{-1}$. The first and second cladding layers were formed from exemplary glass composition 2-6, which had an average CTE of $31.7 \times 10^{-7}$ °C.$^{-1}$. The thickness of the glass sheet was 0.7 mm. The thickness of the core layer was about 0.6 mm, and the thickness of each cladding layer was about 0.05 mm. The glass sheet had a surface compression of 190 MPa.

Example 5

A laminated glass sheet having the general structure shown in FIG. 1 was formed using a fusion draw process. The core layer was formed from exemplary glass composition 1-8, which had an average CTE of $74.6 \times 10^{-7}$ °C.$^{-1}$. The first and second cladding layers were formed from exemplary glass composition 2-7, which had an average CTE of $30.9 \times 10^{-7}$ °C.$^{-1}$. The thickness of the glass sheet was 0.7 mm. The thickness of the core layer was about 0.612 mm, and the thickness of each cladding layer was about 0.044 mm. The glass sheet had a surface compression of 190 MPa.

Example 6

A laminated glass sheet having the general structure shown in FIG. 1 was formed using a fusion draw process. The core layer was formed from exemplary glass composition 1-11, which had an average CTE of about $85 \times 10^{-7}$ °C.$^{-1}$. The first and second cladding layers were formed from exemplary glass composition 2-8, which had an average CTE of about $35 \times 10^{-7}$ °C.$^{-1}$. The thickness of the glass sheet was 0.7 mm. The thickness of the core layer was about 0.594 mm, and the thickness of each cladding layer was about 0.053 mm. The glass sheet had a surface compression of 300 MPa.

Comparative Example 1

A non-strengthened, single layer glass sheet was formed from a boroaluminosilicate glass. The thickness of the glass sheet was 1.5 mm.

Comparative Example 2

A single layer glass sheet was formed from soda lime glass. The thickness of the glass sheet was 0.7 mm. The glass sheet was subjected to an ion exchange process. The ion-exchanged glass sheet had a surface compression of 534 MPa and a depth of layer (DOL) of 0.012 mm.

Comparative Example 3

A single layer glass sheet was formed from an ion-exchangeable glass. The thickness of the glass sheet was 0.7 mm. The glass sheet was subjected to an ion exchange process. The ion-exchanged glass sheet had a surface compression of 855 MPa and a DOL of 0.042 mm.

Comparative Example 4

A single layer glass sheet was formed from soda lime glass. The thickness of the glass sheet was 1.9 mm. The glass sheet was subjected to a heat strengthening process. The heat-strengthened glass sheet had a surface compression of 30 MPa and a DOL of 0.38 mm.

Comparative Example 5

A single layer glass sheet was formed from soda lime glass. The thickness of the glass sheet was 3.9 mm. The glass sheet was subjected to a tempering process to form a fully tempered glass sheet.

Comparative Example 6

A single layer glass sheet was formed from an ion-exchangeable glass. The thickness of the glass sheet was 0.7 mm. The glass sheet was subjected to an ion exchange process. The ion-exchanged glass sheet had a surface compression of 769 MPa and a DOL of 0.041 mm.

Comparative Example 7

A single layer glass sheet was formed from an ion-exchangeable glass. The thickness of the glass sheet was 0.7 mm. The glass sheet was subjected to an ion exchange process. The ion-exchanged glass sheet had a surface compression of 915 MPa and a DOL of 0.04 mm.

Comparative Example 8

A single layer glass sheet was formed from an ion-exchangeable glass. The thickness of the glass sheet was 1 mm. The glass sheet was subjected to an ion exchange process. The ion-exchanged glass sheet had a surface compression of 906 MPa and a DOL of 0.079 mm.

Comparative Example 9

A single layer glass sheet was formed from an ion-exchangeable glass. The thickness of the glass sheet was 1 mm. The glass sheet was subjected to an ion exchange process. The ion-exchanged glass sheet had a surface compression of 373 MPa and a DOL of 0.114 mm.

FIGS. 3-12 illustrate various properties of the examples and comparative examples described herein. In FIGS. 3-10 and 12, ranges of data points that were determined for multiple samples of each example or comparative example are shown. The values reported herein for the various properties are given as average values. Thus, the retained strength, indentation threshold, Knoop scratch threshold, Vickers scratch threshold, and drop threshold values of a given example or comparative example are reported herein as the average values determined for that example or comparative example.

The surfaces of glass sheets formed according to Example 1 and Comparative Example 1 were abraded with 1 mL of 90 grit SiC particles for 5 seconds at abrasion pressures of 5 psi, 15 psi, and 25 psi. The retained strengths at the various abrasion pressures are shown in FIG. 3.

Figure 3:
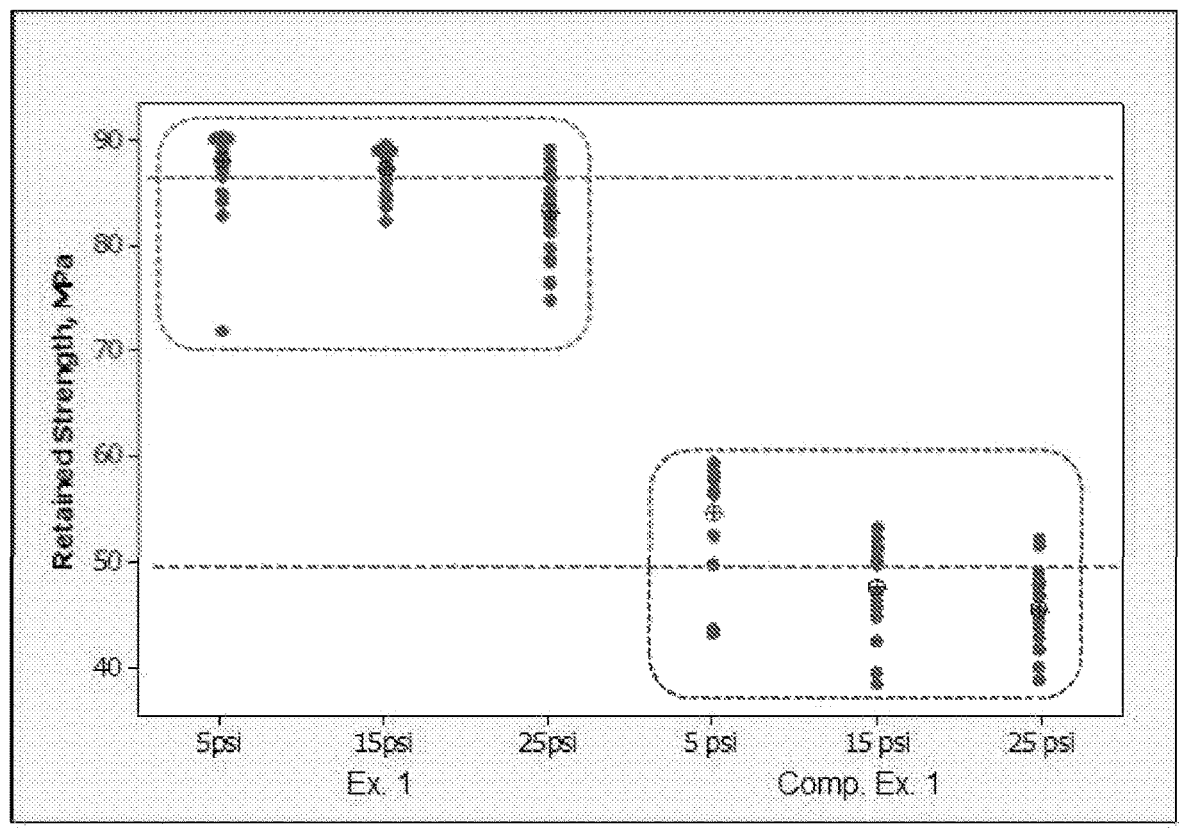
FIG. 3 is a graphical illustration of the retained strength vs. abrasion pressure for laminated glass sheets formed according to Example 1 and non-strengthened glass sheets formed according to Comparative Example 1.

As illustrated in FIG. 3, the laminated glass sheet retained much of its strength over a wide range of insult conditions as compared to the non-strengthened glass sheet. The retained strength of the laminated glass sheet was reduced from about 88 MPa at an abrasion pressure of 5 psi to about 83 MPa at an abrasion pressure of 25 psi. Thus, the ratio of the retained strength at the abrasion pressure of 25 psi to the retained strength at the abrasion pressure of 5 psi was about 0.9. The retained strength of the non-strengthened glass sheet was reduced from about 55 MPa at an abrasion pressure of 5 psi to about 46 MPa at an abrasion pressure of 25 psi. Thus, the ratio of the retained strength at the abrasion pressure of 25 psi to the retained strength at the abrasion pressure of 5 psi was about 0.8.

The surfaces of glass sheets formed according to Example 2 and Comparative Example 2 were abraded with 1 mL of 90 grit SiC particles for 5 seconds at abrasion pressures of 5 psi, 15 psi, and 25 psi. The retained strengths at the various abrasion pressures are shown in FIG. 4.

Figure 4:
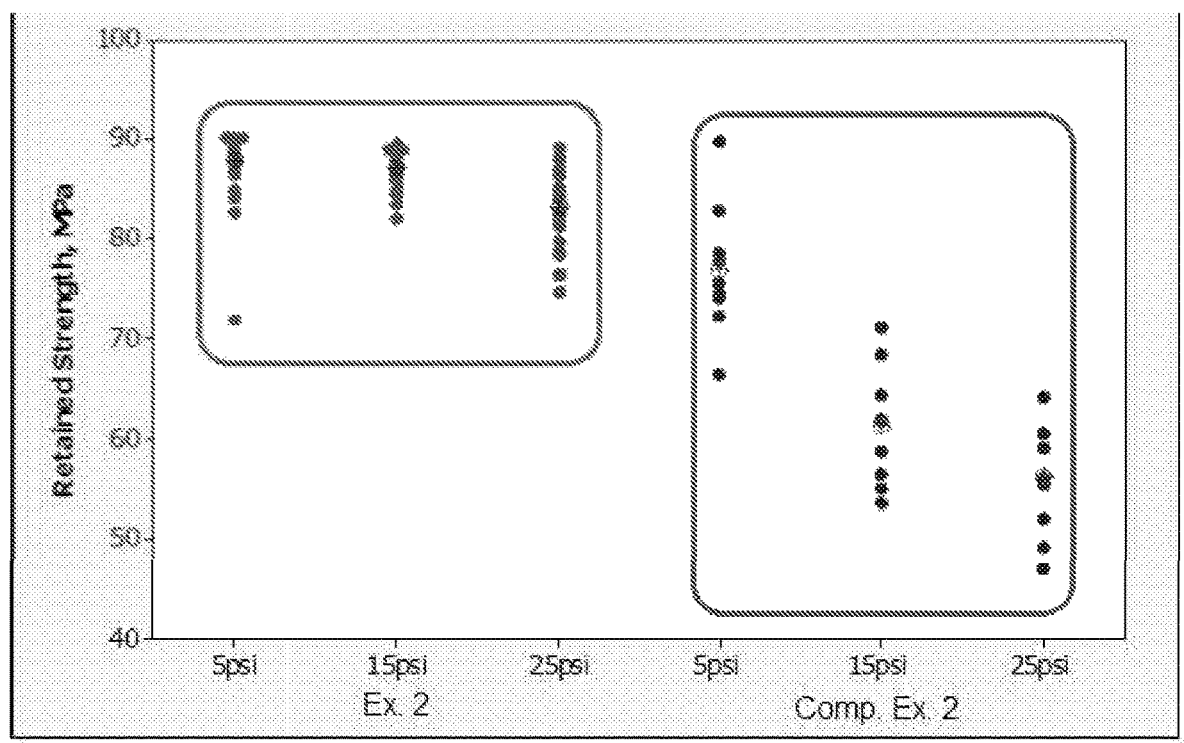
FIG. 4 is a graphical illustration of the retained strength vs. abrasion pressure for laminated glass sheets formed according to Example 2 and ion-exchanged glass sheets formed according to Comparative Example 2.

As illustrated in FIG. 4, the laminated glass sheet retained much of its strength over a wide range of insult conditions as compared to the ion-exchanged soda lime glass sheet. The retained strength of the laminated glass sheet was reduced from about 88 MPa at an abrasion pressure of 5 psi to about 83 MPa at an abrasion pressure of 25 psi. Thus, the ratio of the retained strength at the abrasion pressure of 25 psi to the retained strength at the abrasion pressure of 5 psi was about 0.9. The retained strength of the ion-exchanged soda lime glass sheet was reduced from about 77 MPa at an abrasion pressure of 5 psi to about 56 MPa at an abrasion pressure of 25 psi. Thus, the ratio of the retained strength at the abrasion pressure of 25 psi to the retained strength at the abrasion pressure of 5 psi was about 0.7. Although the compressive stress of the ion-exchanged soda lime glass sheet (534 MPa) was significantly higher than the compressive stress of the laminated glass sheet (35 MPa), the strength of the ion-exchanged soda lime glass sheet was reduced more sharply as the insult level increased compared to the laminated glass sheet.

The surfaces of glass sheets formed according to Example 2 and Comparative Example 3 were abraded with 1 mL of 90 grit SiC particles for 5 seconds at abrasion pressures of 5 psi, 15 psi, and 25 psi. The retained strengths at the various abrasion pressures are shown in FIG. 5.

Figure 5:
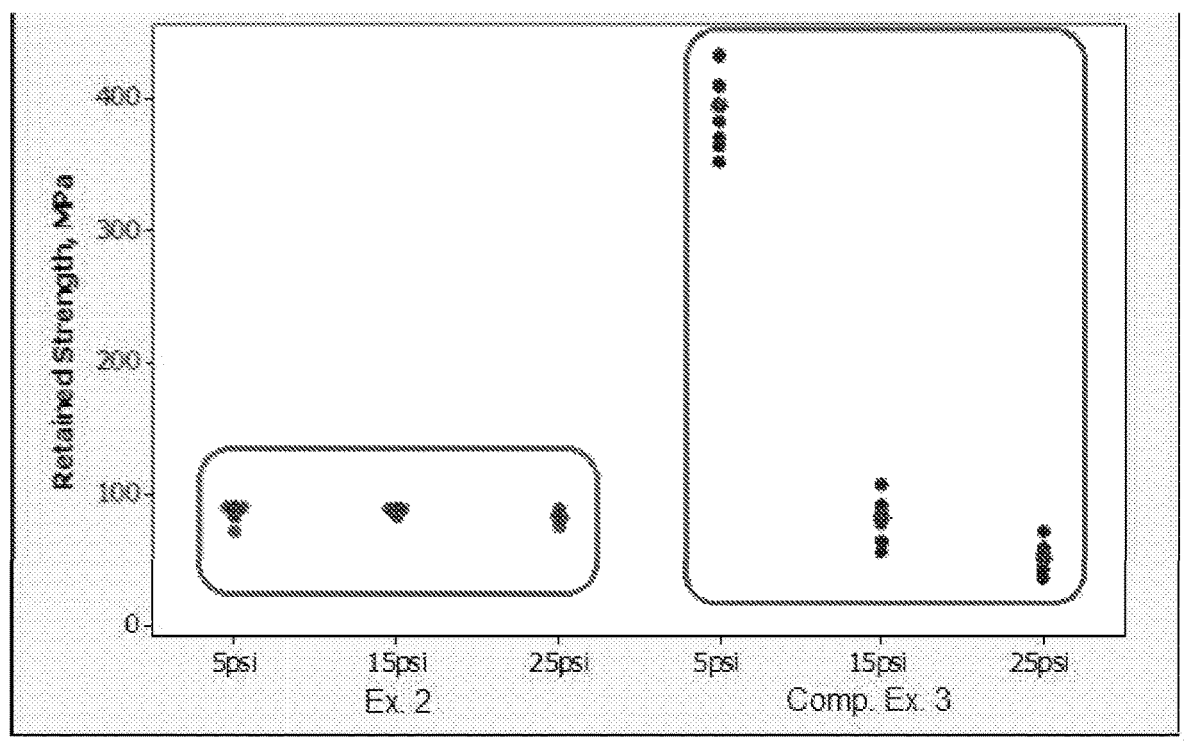
FIG. 5 is a graphical illustration of the retained strength vs. abrasion pressure for laminated glass sheets formed according to Example 2 and ion-exchanged glass sheets formed according to Comparative Example 3.

As illustrated in FIG. 5, the laminated glass sheet retained much of its strength over a wide range of insult conditions as compared to the ion-exchanged glass sheet. The retained strength of the laminated glass sheet was reduced from about 88 MPa at an abrasion pressure of 5 psi to about 83 MPa at an abrasion pressure of 25 psi. Thus, the ratio of the retained strength at the abrasion pressure of 25 psi to the retained strength at the abrasion pressure of 5 psi was about 0.9. The retained strength of the ion-exchanged glass sheet was reduced from about 395 MPa at an abrasion pressure of 5 psi to about 53 MPa at an abrasion pressure of 25 psi. Thus, the ratio of the retained strength at the abrasion pressure of 25 psi to the retained strength at the abrasion pressure of 5 psi was about 0.1. Although the compressive stress of the ion-exchanged glass sheet (855 MPa) was significantly higher than the compressive stress of the laminated glass sheet (35 MPa), the strength of the ion-exchanged glass sheet was reduced more sharply as the insult level increased compared to the laminated glass sheet.

The surfaces of glass sheets formed according to Example 3, Example 4, Example 5, Example 6, Comparative Example 1, and Comparative Example 3 were abraded with 1 mL of 90 grit SiC particles for 5 seconds at abrasion pressures of 5 psi, 15 psi, and 25 psi. The retained strengths at the various abrasion pressures are shown in FIG. 6.

Figure 6:
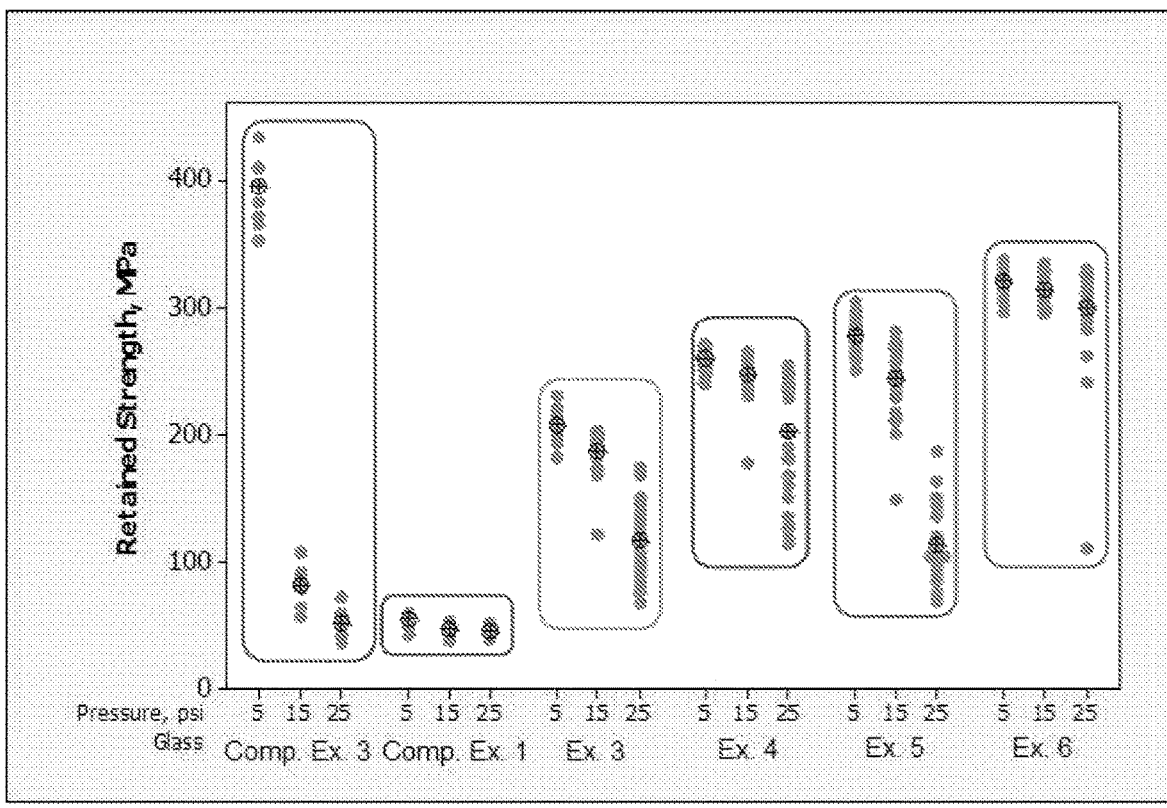
FIG. 6 is a graphical illustration of the retained strength vs. abrasion pressure for laminated glass sheets formed according to Example 3, non-strengthened glass sheets formed according to Comparative Example 1, and ion-exchanged glass sheets formed according to Comparative Example 3.

As illustrated in FIG. 6, the laminated glass sheets of Examples 3-6 had high compressive stress compared to the non-strengthened glass sheet of Comparative Example 1 while also retaining much of their strength over a wide range of insult conditions. The average strength of the laminated glass sheet of Example 3 at the various abrasion pressures was about 171 MPa. The average strength of the laminated glass sheet of Example 4 at the various abrasion pressures was about 220 MPa. The average strength of the laminated glass sheet of Example 5 at the various abrasion pressures was about 220 MPa. The average strength of the laminated glass sheet of Example 6 at the various abrasion pressures was about 300 MPa. Conversely, the average retained strength of the non-strengthened glass sheet at the various abrasion pressures was about 49 MPa.

As illustrated in FIG. 6, the laminated glass sheets of Examples 3-6 retained much of their strength over a wide range of insult conditions as compared to the ion-exchanged glass sheet. The retained strength of the laminated glass sheet of Example 3 was reduced from about 208 MPa at an abrasion pressure of 5 psi to about 117 MPa at an abrasion pressure of 25 psi. Thus, the ratio of the retained strength at the abrasion pressure of 25 psi to the retained strength at the abrasion pressure of 5 psi was about 0.6. The retained strength of the laminated glass sheet of Example 4 was reduced from about 250 MPa at an abrasion pressure of 5 psi to about 200 MPa at an abrasion pressure of 25 psi. Thus, the ratio of the retained strength at the abrasion pressure of 25 psi to the retained strength at the abrasion pressure of 5 psi was about 0.8. The retained strength of the laminated glass sheet of Example 5 was reduced from about 270 MPa at an abrasion pressure of 5 psi to about 117 MPa at an abrasion pressure of 25 psi. Thus, the ratio of the retained strength at the abrasion pressure of 25 psi to the retained strength at the abrasion pressure of 5 psi was about 0.4. The retained strength of the laminated glass sheet of Example 6 was reduced from about 305 MPa at an abrasion pressure of 5 psi to about 300 MPa at an abrasion pressure of 25 psi. Thus, the ratio of the retained strength at the abrasion pressure of 25 psi to the retained strength at the abrasion pressure of 5 psi was about 0.98. The retained strength of the ion-exchanged glass sheet was reduced from about 395 MPa at an abrasion pressure of 5 psi to about 53 MPa at an abrasion pressure of 25 psi. Thus, the ratio of the retained strength at the abrasion pressure of 25 psi to the retained strength at the abrasion pressure of 5 psi was about 0.1. Although the ion-exchanged glass sheet of Example 3 had a similar average strength (178 MPa) as the laminated glass sheet (171 MPa) at the various abrasion pressures, the strength of the ion-exchanged glass sheet was reduced more sharply as the insult level increased compared to the laminated glass sheet. The strengths of the ion-exchanged glass sheet also was reduced more sharply as the insult level increased compared to the laminated glass sheets of Examples 4-6.

Figure 7:
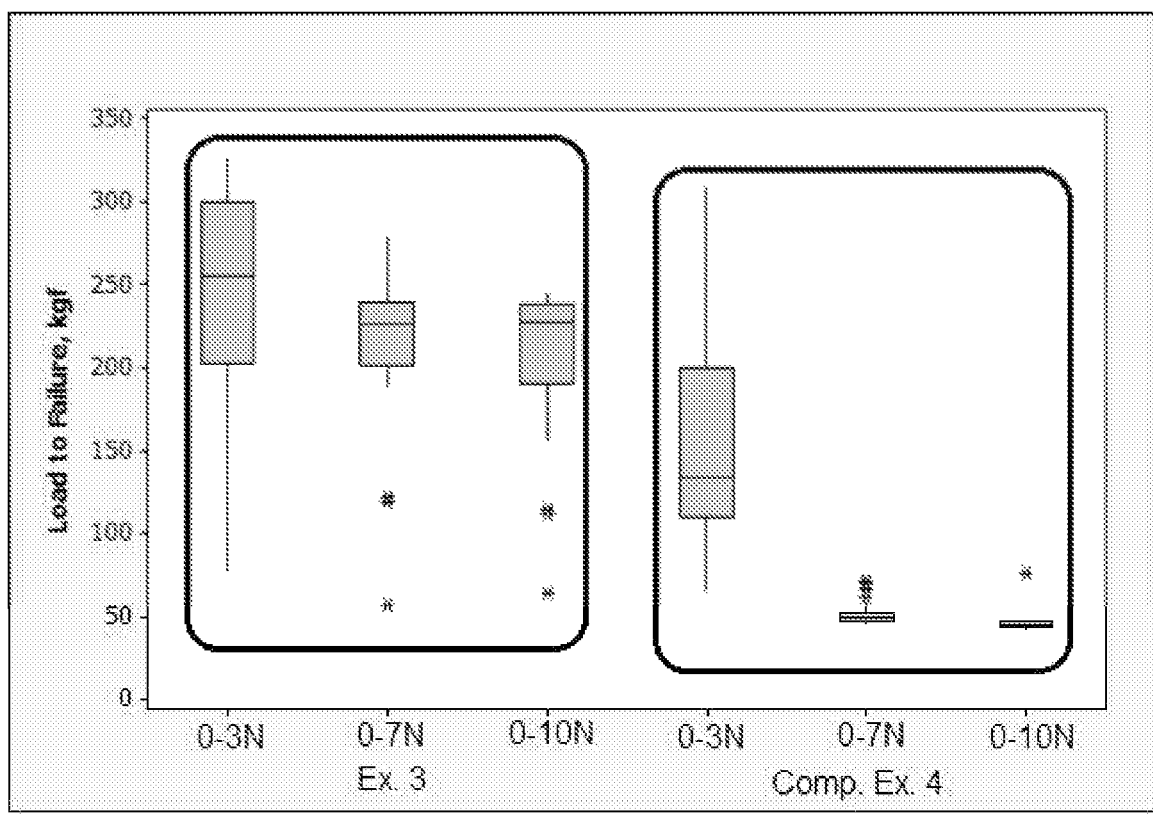
FIG. 7 is a graphical illustration of the retained strength (given as load to failure) vs. ramped Knoop scratch load for laminated glass sheets formed according to Example 3 and heat-strengthened glass sheets formed according to Comparative Example 4.

The surfaces of glass sheets formed according to Example 3 and Comparative Example 4 were scratched at increasing scratch loads of 0 to 3 N, 0 to 7 N, and 0 to 10 N. The retained strengths at the various ramped scratch loads are shown in FIG. 7. The retained strengths in FIG. 7 are given as load to failure determined using the ring-on-ring test method.

As illustrated in FIG. 7, the laminated glass sheet retained much of its strength over a wide range of insult conditions as compared to the heat-strengthened glass sheet. The retained strength of the laminated glass sheet was reduced from about 245 kgf at a ramped Knoop scratch load of 0 to 3 N to about 205 kgf at a ramped Knoop scratch load of 0 to 10 N. Thus, the ratio of the retained strength at the ramped Knoop scratch load of 0 to 10 N to the retained strength at the ramped Knoop scratch load of 0 to 3 N was about 0.8. The retained strength of the heat-strengthened glass sheet was reduced from about 152 kgf at a ramped Knoop scratch load of 0 to 3 N to about 46 kgf at a ramped Knoop scratch load of 0 to 10 N. Thus, the ratio of the retained strength at the ramped Knoop scratch load of 0 to 10 N to the retained strength at the ramped Knoop scratch load of 0 to 3 N was about 0.3. Although the heat-strengthened glass sheet was about twice as thick as the laminated glass sheet, the thinner laminated glass sheet retained more of its strength at various scratch loading conditions compared to the heat-strengthened glass sheet, which suggests that a laminated glass can sustain large flaws with relatively low thickness. This can enable production of thin glass articles with uniform retained strength, which may be beneficial for producing light weight glass sheets for use, for example, in automotive applications and/or cover glass applications.

The surfaces of glass sheets formed according to Example 3, Comparative Example 4, and Comparative Example 5 were scratched at increasing scratch loads of 0 to 3 N, 0 to 7 N, and 0 to 10 N. The retained strengths at the various ramped scratch loads are shown in FIG. 8.

Figure 8:
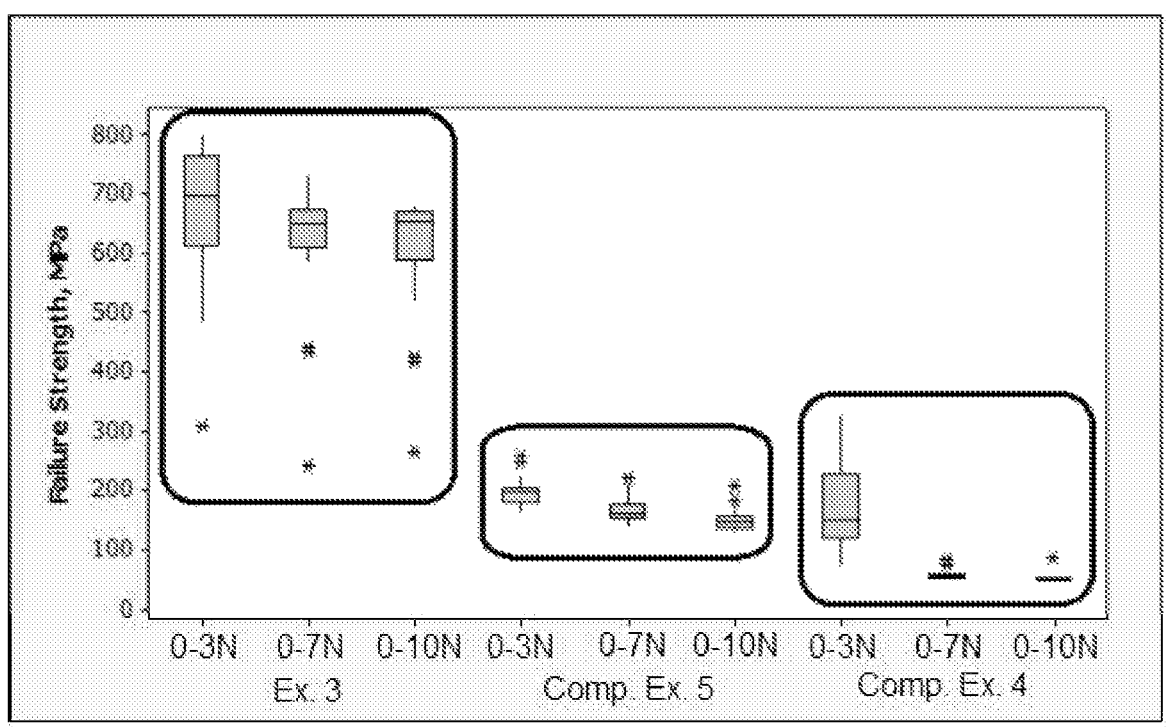
FIG. 8 is a graphical illustration of the retained strength vs. ramped scratch load for laminated glass sheets formed according to Example 3, heat-strengthened glass sheets formed according to Comparative Example 4, and fully-tempered glass sheets formed according to Comparative Example 5.

As illustrated in FIG. 8, the laminated glass sheet retained much of its strength over a wide range of insult conditions as compared to both the heat-strengthened glass sheet and the fully-tempered glass sheet. The retained strength of the laminated glass sheet was reduced from about 668 MPa at a ramped Knoop scratch load of 0 to 3 N to about 603 MPa at a ramped Knoop scratch load of 0 to 10 N. Thus, the ratio of the retained strength at the ramped Knoop scratch load of 0 to 10 N to the retained strength at the ramped Knoop scratch load of 0 to 3 N was about 0.9. The retained strength of the heat-strengthened glass sheet was reduced from about 168 MPa at a ramped Knoop scratch load of 0 to 3 N to about 52 MPa at a ramped Knoop scratch load of 0 to 10 N. Thus, the ratio of the retained strength at the ramped Knoop scratch load of 0 to 10 N to the retained strength at the ramped Knoop scratch load of 0 to 3 N was about 0.3. The retained strength of the fully-tempered glass sheet was reduced from about 195 MPa at a ramped Knoop scratch load of 0 to 3 N to about 151 MPa at a ramped Knoop scratch load of 0 to 10 N. Thus, the ratio of the retained strength at the ramped Knoop scratch load of 0 to 10 N to the retained strength at the ramped Knoop scratch load of 0 to 3 N was about 0.8. Although both the heat-strengthened glass sheet and the fully-tempered glass sheet were substantially thicker than the laminated glass sheet, the thinner laminated glass sheet retained more of its strength at various scratch loading conditions compared to the heat-strengthened glass sheet and the fully-tempered glass sheet, which further suggests that a laminated glass can sustain large flaws with relatively low thickness.

Figure 9:
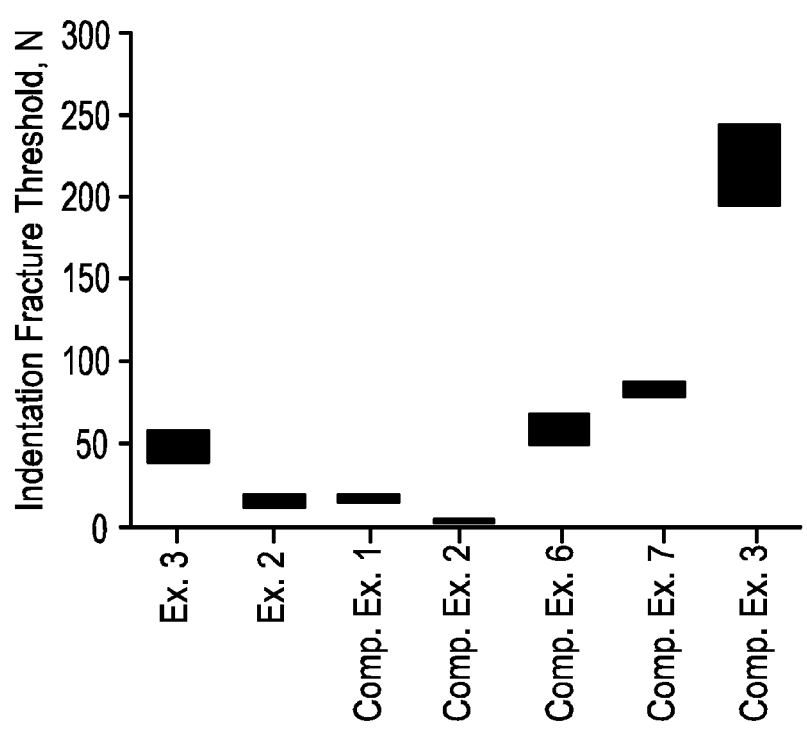
FIG. 9 is a graphical illustration of the indentation thresholds of laminated glass sheets formed according to Examples 2 and 3, non-strengthened glass sheets formed according to Comparative Example 1, and ion-exchanged glass sheets formed according to Comparative Examples 2, 3, 6, and 7.
Figure 10:
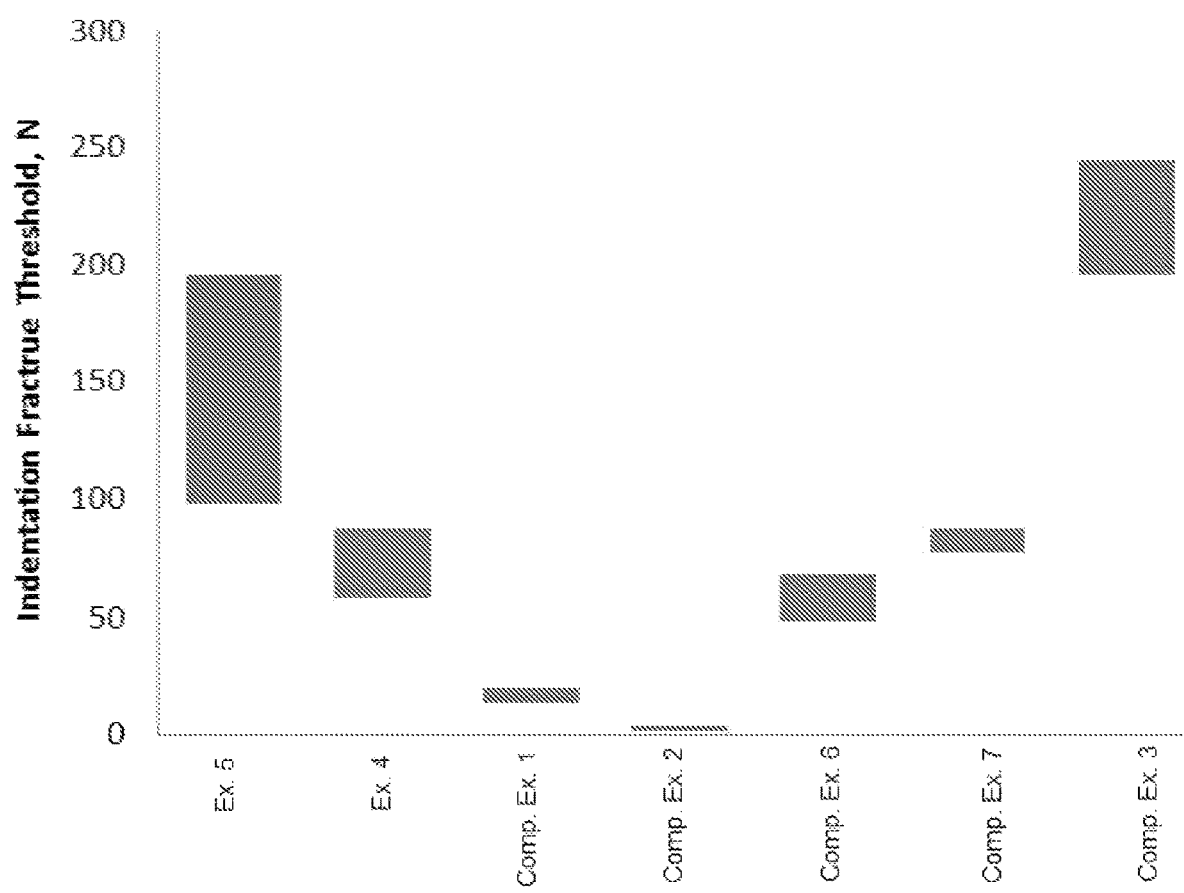
FIG. 10 is a graphical illustration of the indentation thresholds of laminated glass sheets formed according to Examples 4 and 5, non-strengthened glass sheets formed according to Comparative Example 1, and ion-exchanged glass sheets formed according to Comparative Examples 2, 3, 6, and 7.

FIG. 9 shows the indentation thresholds of glass sheets formed according to Example 2, Example 3, Comparative Example 1, Comparative Example 2, Comparative Example 3, Comparative Example 6, and Comparative Example 7. Similarly, FIG. 10 shows the indentation thresholds of glass sheets formed according to Example 4, Example 5, Comparative Example 1, Comparative Example 2, Comparative Example 3, Comparative Example 6, and Comparative Example 7. Although the laminated glass sheets of Example 2, Example 3, Example 4, and Example 5 have clad layer dimensions that are similar to the DOL of the ion-exchanged glass sheets of Comparative Example 3, Comparative Example 6, and Comparative Example 7, the compressive stresses of the laminated glass sheets are substantially lower. Thus, conventional wisdom suggests that the laminated glass sheets would have far lower indentation thresholds compared to the ion-exchanged glass sheets. However, as shown in FIG. 9, the laminated glass sheet of Example 3 has an indentation threshold (50 N) that is similar to that of Comparative Example 6 (55 N), despite the relatively low compressive stress of the laminated glass sheet. Similarly, as shown in FIG. 10, the laminated glass sheet of Example 4 has an indentation threshold (80 N) that is higher than that of Comparative Example 6 (55 N), and the laminated glass sheet of Example 5 has an indentation threshold (150 N) that is higher than those of Comparative Example 6 (55 N) and Comparative Example 7 (95 N), despite the relatively low compressive stress values of the laminated glass sheets.

Figure 11:
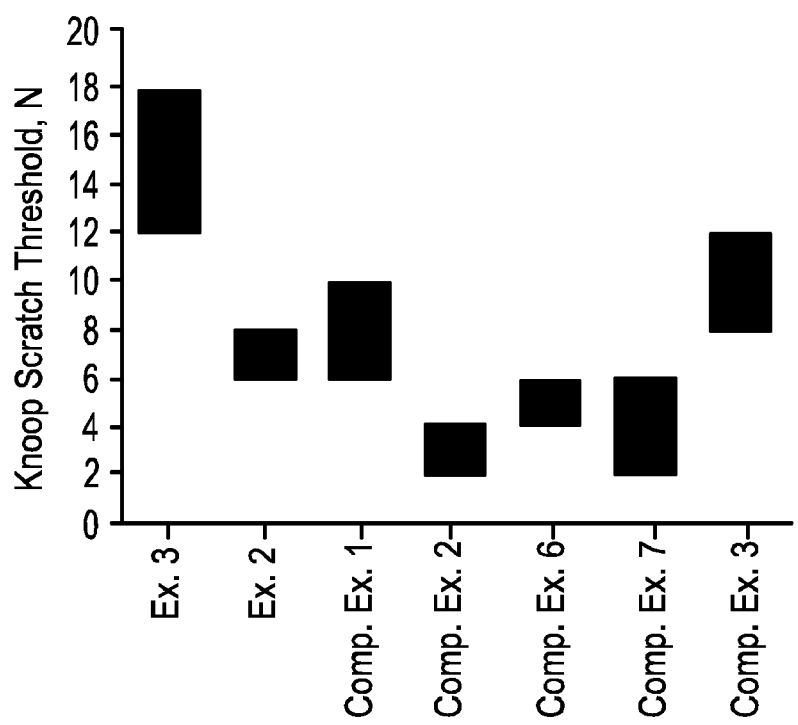
FIG. 11 is a graphical illustration of the Knoop scratch thresholds of laminated glass sheets formed according to Examples 2 and 3, non-strengthened glass sheets formed according to Comparative Example 1, and ion-exchanged glass sheets formed according to Comparative Examples 2, 3, 6, and 7.

FIG. 11 shows the Knoop scratch thresholds of glass sheets formed according to Example 2, Example 3, Comparative Example 1, Comparative Example 2, Comparative Example 3, Comparative Example 6, and Comparative Example 7. Similar to the indentation threshold, conventional wisdom suggests that the laminated glass sheets would have far lower Knoop scratch thresholds compared to the ion-exchanged glass sheets (e.g., as a result of the relatively low compressive stresses of the laminated glass sheets). However, as shown in FIG. 11, the laminated glass sheet of Example 2 has a Knoop scratch threshold (7 N) that is greater than those of Comparative Example 6 (5 N) and Comparative Example 7 (4 N), and the laminated glass sheet of Example 3 has a Knoop scratch threshold (15 N) that is greater than those of Comparative Example 3 (11 N), Comparative Example 6 (5 N), and Comparative Example 7 (4 N), despite the relatively low compressive stresses of the laminated glass sheets. Although not shown in FIG. 11, the laminated glass sheet formed according to Example 4 has a Knoop scratch threshold of about 18 N (within individual samples ranging between about 15 N and about 20 N).

Although not wishing to be bound by any theory, it is believed that the unexpectedly high indentation and Knoop scratch thresholds of the laminated glass sheets may be a result of the step stress profile of the laminated glass sheets (as opposed to the error function stress profile of the ion-exchanged glass sheets) in combination with the relatively lower magnitude of compressive stress of the laminated glass sheets compared to the ion-exchanged glass sheets. For example, the relatively lower compressive stresses may contribute to the unexpectedly high Knoop scratch thresholds of the laminated glass sheets because higher compressive stress may encourage lateral cracks to form in the glass article and cause failure.

Figure 12:
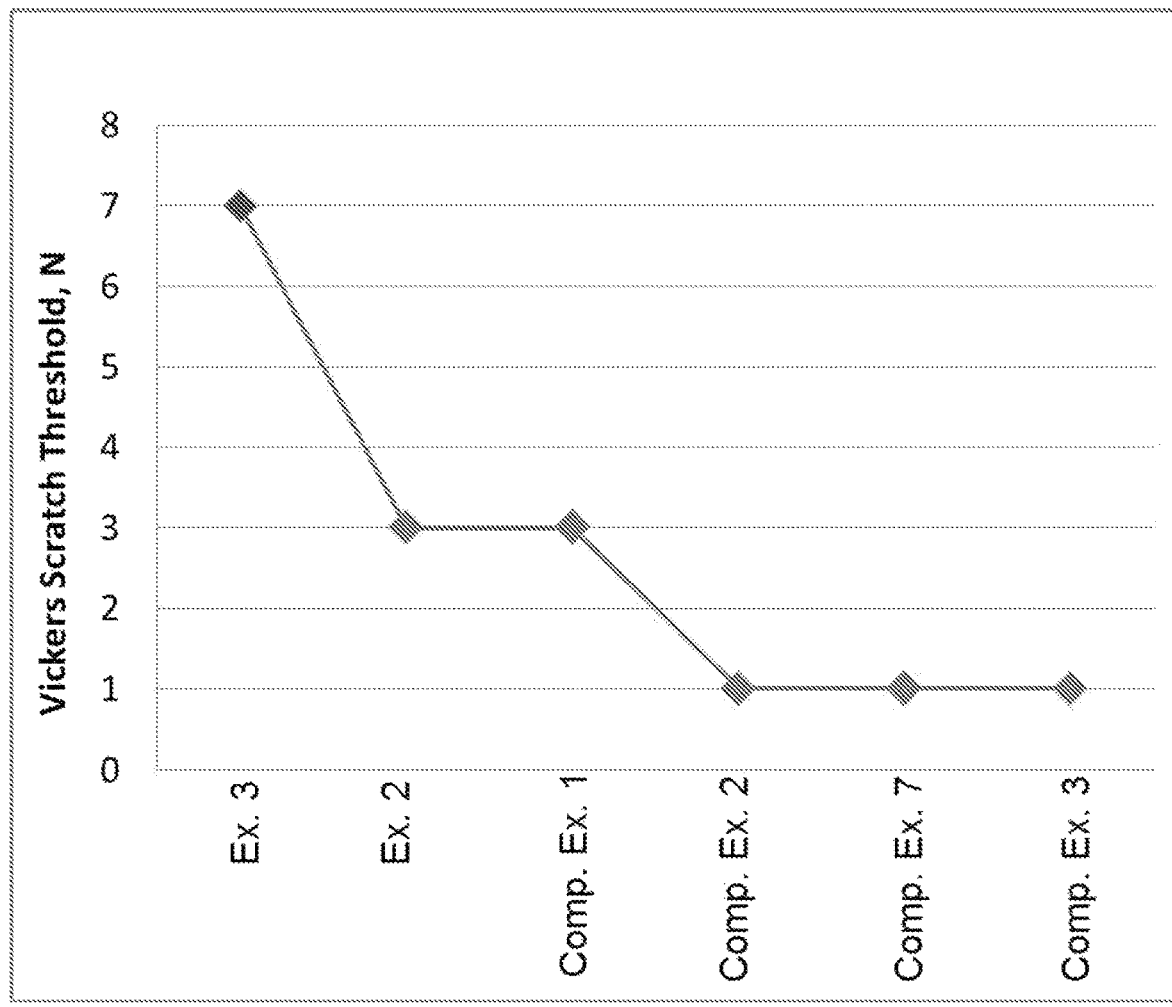
FIG. 12 is a graphical illustration of the Vickers scratch thresholds of laminated glass sheets formed according to Examples 2 and 3, non-strengthened glass sheets formed according to Comparative Example 1, and ion-exchanged glass sheets formed according to Comparative Examples 2, 3, and 7.

FIG. 12 shows the Vickers scratch thresholds of glass sheets formed according to Example 2, Example 3, Comparative Example 1, Comparative Example 2, Comparative Example 3, and Comparative Example 7. Similar to the indentation threshold and the Knoop scratch threshold, conventional wisdom suggests that the laminated glass sheets would have far lower Vickers scratch thresholds compared to the ion-exchanged glass sheets (e.g., as a result of the relatively low compressive stresses of the laminated glass sheets). However, as shown in FIG. 12, the laminated glass sheet of Example 2 has a Vickers scratch threshold (3 N) that is substantially the same as that of Comparative Example 1 (3 N) and greater than those of Comparative Example 2 (1 N), Comparative Example 3 (1 N), and Comparative Example 7 (1 N). The laminated glass sheet of Example 3 has a Vickers scratch threshold (7 N) that is greater than those of Comparative Example 1 (3 N), Comparative Example 2 (1 N), Comparative Example 3 (1 N), and Comparative Example 7 (1 N). Thus, Example 2 and Example 3 have unexpectedly high Vickers scratch thresholds despite the relatively low compressive stresses of the laminated glass sheets.

Figure 13:
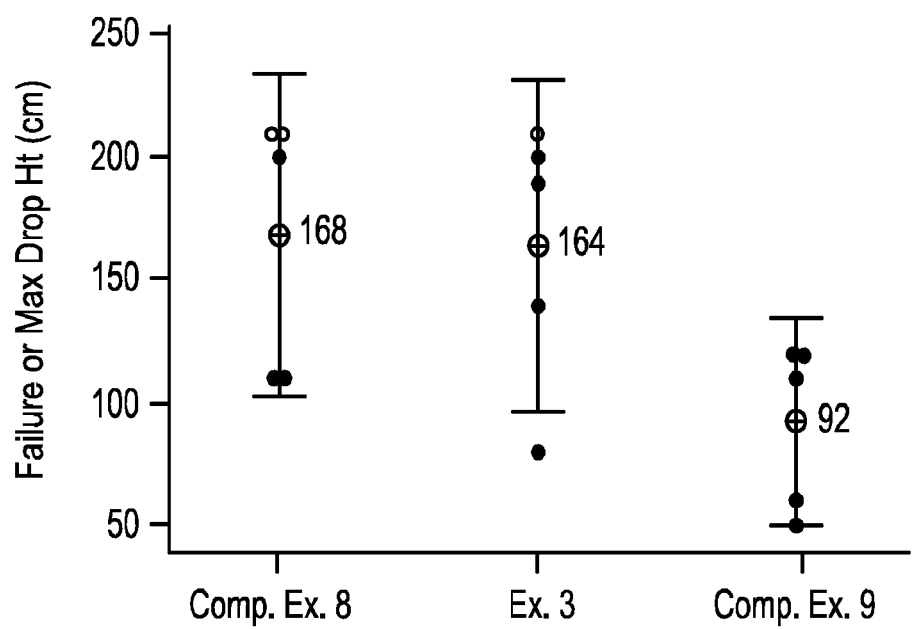
FIG. 13 is a graphical illustration of the drop thresholds of laminated glass sheets formed according to Example 3 and ion-exchanged glass sheets formed according to Comparative Examples 8 and 9.

FIG. 13 shows the drop thresholds of glass sheets formed according to Example 3, Comparative Example 8, and Comparative Example 9. The maximum drop height was 210 cm. The data points shown at 210 cm survived the drop from the maximum drop height. The confidence intervals shown in FIG. 13 are 95% confidence intervals for the means. Conventional wisdom suggests that the laminated glass sheet would have a far lower drop threshold compared to the ion-exchanged glass sheets (e.g., as a result of the relatively low compressive stress of the laminated glass sheet). However, as shown in FIG. 13, the laminated glass sheet of Example 3 has a drop threshold (164 cm) that is substantially the same as that of Comparative Example 8 (168 cm) and greater than that of Comparative Example 9 (92 cm). Thus, Example 3 has an unexpectedly high drop threshold despite the relatively low compressive stress of the laminated glass sheet.

It will be apparent to those skilled in the art that various modifications and variations can be made without departing from the spirit or scope of the invention. Accordingly, the invention is not to be restricted except in light of the attached claims and their equivalents.

What is claimed is:

1. A glass article comprising:
   a glass core layer; and
   a glass cladding layer adjacent to the core layer;
   wherein an average coefficient of thermal expansion (CTE) of the core layer is at least $55 \times 10^{-7}$ °C.$^{-1}$, an average CTE of the cladding layer is at most $35 \times 10^{-7}$ °C.$^{-1}$, the average CTE of the glass core layer and the average CTE of the glass cladding layer differ by from $20 \times 10^{-7}$ °C.$^{-1}$ to $40 \times 10^{-7}$ °C.$^{-1}$, the core layer comprises a tensile stress, and the cladding layer comprises a compressive stress of at most 300 MPa, is substantially free of alkali metal, such that the cladding layer comprises at most about 0.1 mol % alkali metal oxide, and comprises at least 12 mol % $Al_2O_3$;
   wherein a retained strength of the glass article comprises a strength determined after abrasion of an outer surface of the glass article with 1 mL of 90 grit SiC particles for 5 seconds at an abrasion pressure, and a ratio of the retained strength at an abrasion pressure of 25 psi to the retained strength at an abrasion pressure of 5 psi is at least about 0.3;
   wherein a Knoop scratch threshold of the glass article is at least about 5 N; and
   wherein a ratio of a thickness of the core layer to the thickness of the glass article is at least about 0.8.

2. The glass article of claim 1, wherein an indentation threshold of the glass article is at least about 20 N.

3. The glass article of claim 1, wherein a thickness of the glass article is about 0.2 mm to about 2 mm.

4. The glass article of claim 1, wherein the glass article comprises a laminated glass sheet, the cladding layer comprises a first cladding layer and a second cladding layer, and the core layer is disposed between the first cladding layer and the second cladding layer.

5. The glass article of claim 1, wherein a Knoop scratch threshold of the glass article is at least about 10 N, an indentation threshold of the glass article is at least about 30 N.

6. The glass article of claim 1, wherein the compressive stress of the cladding layer is from about 20 MPa to about 200 MPa.

7. The glass article of claim 1, wherein each of the retained strength at an abrasion pressure of 5 psi and the retained strength at an abrasion pressure of 25 psi is from about 80 MPa to about 375 MPa.

8. The glass article of claim 1, wherein the glass article comprises a gradient in at least one elastic property along a thickness of the glass article.

9. The glass article of claim 8, wherein the cladding layer comprises the gradient in the at least one elastic property.

10. The glass article of claim 8, wherein an interface of the core layer and the cladding layer comprises the gradient in the at least one elastic property.

11. The glass article of claim 8, wherein the at least one elastic property comprises at least one of a Young's modulus, a shear modulus, or a Poisson's ratio.

* * * * *